Patented Jan. 6, 1953

2,624,751

UNITED STATES PATENT OFFICE 2,624,751

TRICHLOROETHYLIDENE CYANOACETIC ACID ALKYL ESTER AND PROCESS

David T. Mowry and Arthur H. Schlesinger, Dayton, Ohio, assignors to Monsanto Chemical Company, St. Louis, Mo., a corporation of Delaware No Drawing. Application March 23, 1951,
Serial No. 217,318

3 Claims. (Cl. 260—465.4)

The present invention relates to new polyhalogenated esters and to selective herbicides containing the new esters.

An object of the invention is to provide new and valuable compounds having a selective herbicidal activity. Another object is the preparation of useful compounds from chloral and allyl cyanoacetate. Another object of the invention is to prepare in good yields from chloral and allyl cyanoacetate a product having selective herbicidal activity. A further object is to provide a method of destroying broad-leafed plants without injuring narrow-leafed plants. Still another object of the invention is to provide readily available, highly efficient weed destroying compositions.

These and other objects hereinafter disclosed are provided by the following invention wherein chloral is contacted with allyl cyanoacetate to yield compounds which have been found to possess a high degree of selective herbicidal activity.

We have found that under certain hereinafter defined conditions chloral may be caused to undergo a condensation with loss of water when reacted with allyl cyanoacetate to yield either allyl 2,2,2-trichloroethylidenecyanoacetate or diallyl 1,3-dicyano-2-(trichloromethyl) glutarate or a mixture of the two. The reaction of chloral with allyl cyanoacetate probably occurs with the formation of the intermediately formed mono-ester, substantially as follows:

$$Cl_3C.CHO + CNCH_2COOCH_2CH:CH_2 \longrightarrow$$

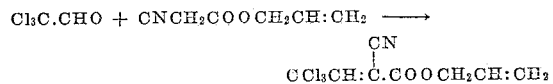

Diallyl 1,3-dicyano-2-(trichloromethyl) glutarate is believed to be formed by addition of another mole of allyl cyanoacetate to the double bond of the intermediately formed allyl 2,2,2-trichloroethylidenecyanoacetate:

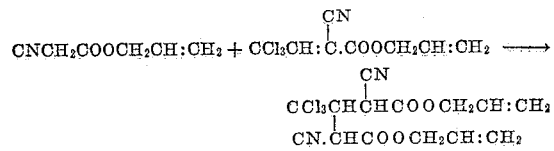

Even though equimolar proportions of the chloral and of the allyl cyanoacetate be employed, there is generally formed a predominance of the di-ester. While the mechanism of the reaction is not thoroughly understood, it is believed that the primary stable product is the di-ester, rather than the mono-ester, and that the latter is probably formed by pyrolysis of the diallyl 1,3-dicyano-2-(trichloromethyl) glutarate to yield allyl 2,2,2-trichloroethylidenecyanoacetate, which latter compound is stable in the presence of the excess of chloral which is present when the allyl cyanoacetate has been depleted by the 1:2 chloral-allyl cyanoacetate reaction.

Condensation of chloral with allyl cyanoacetate to yield either the mono-ester or the di-ester or a mixture of the same is effected by contacting the aldehyde with the ester at increased temperatures and in the presence of a basic catalyst until the formation of the condensation products occurs. Inasmuch as water is evolved during the condensation, completion of the reaction may be determined by measuring the quantity of water which has been given off. The reaction time depends upon the temperature and the activity of the catalyst employed. While temperatures of slightly above room temperature to the refluxing temperature of the reaction mixture may be generally employed, more complete reaction is obtained by operating at refluxing temperature. Also while basic reacting catalysts, generally, may be used, better yields are obtained when the catalyst which is employed is an organic base such as pyridine, quinoline or piperidine, or an alkanolamine such as ethanolamine or diisopropanolamine.

It is also advantageous to effect the reaction in the presence of an inert solvent or diluent, possible side-reactions being thereby avoided or mitigated. As inert diluents or solvents one may employ ethers such as ethyl ether or isopropyl ether, hydrocarbons such as benzene, toluene or hexane, etc.

Formation of the mono-ester vs. the di-ester is primarily a function of reactant quantities. While even equimolar amounts of chloral and allyl cyanoacetate yield a preponderant amount of the di-ester, the reaction can be steered toward giving greater quantities of the mono-ester by operating with a large excess of the aldehyde. Conversely, the use of a large excess of the allyl cyanoacetate results in the production of the di-ester with accompanying substantial exclusion of mono-ester formation. Reaction temperatures and times and the nature of the catalyst also influence the nature of the reaction product; hence the product is generally a mixture of the two esters, the proportion of the mono-ester and of the di-ester in such mixtures varying with the reactant quantities and the reaction conditions. The esters may be readily isolated, e. g., by fractional distillation.

Allyl 2,2,2-trichloroethylidenecyanoacetate may also be prepared by contacting 2,2,2-trichloroethylidenecyanoacetic acid with allyl alcohol in the presence of an esterifying catalyst.

Allyl 2,2,2-trichloroethylidenecyanoacetate and diallyl 1,3-dicyano-2-(trichloroemthyl) glutarate or mixtures of the same are very advantageously employed as selective herbicides.

A number of selective herbicides are known, a variety of organic and inorganic compounds having been suggested in the prior art for use as plant-killers. Among the disadvantages of the known selective herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil micro-organisms, which results in loss of the active material. Thus, a herbicide possessing a free carboxy group may be substantially deactivated in highly alkaline soil by reaction with basic, salt-forming materials in such soils. Conversely, a herbicide having reactive basic substituents may be deactivated by reaction with acid constituents of acidic soils.

We have found that allyl 2,2,2-trichloroethylidenecyanoacetate and diallyl 1,3-dicyano-2-(trichloromethyl) glutarate or mixtures of the same are stable, non-corrosive herbicidal compositions having a high degree of selective herbicidal activity when employed even in very small concentrations. Herbicidal compositions containing either of the two esters or mixtures of the same as the active ingredient inhibit the growth of broad-leafed plants with only little effect on the normal growth of narrow-leafed plants. Accordingly, the present products are advantageously employed as deweeding compositions for lawns and other plantings in which grasses and other narrow-leafed plants are to be freed of undesirable broad-leafed growth, e. g., weeds such as the plantain, pea-vine and jimson-weeds.

The selective efficiency of a herbicide may be measured by comparing the concentrations of a herbicide required to produce a certain inhibition of growth on a broad-leafed plant with the concentrations of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson, and Norman, Botanical Gazette, 107, 476–507 (1946).

The invention is further illustrated, but not limited, by the following examples:

Example 1

A mixture consisting of 73.8 g. (0.5 mole) of chloral, 62.5 g. (0.5 mole) of allyl cyanoacetate, 200 ml. of benzene and about 2 g. of piperidine as catalyst was refluxed for 17 hours in a vessel which was equipped with a water-trap. During this time 7 ml. of water were given off. Benzene was then removed from the reaction mixture by heating in vacuo, the remaining product was taken up with ether, and washed first with dilute hydrochloric acid and then with water. Removal of the ether and fractionation of a portion of the remaining material gave the following:

I. B. P. 150–160° C./33 mm., $n_D^{25}$ 1.4827

II. B. P. 136–137° C./8 mm., $n_D^{25}$ 1.5100

Fraction I, substantially pure diallyl 1,3-dicyano-2-(trichloromethyl) glutarate, analyzed as follows:

|  | Found | Calcd. for $C_{14}H_{13}N_2O_4Cl_3$ |
| --- | --- | --- |
| Percent C | 44.38 | 44.26 |
| Percent H | 3.74 | 3.43 |
| Percent Cl | 28.19 | 28.07 |

Fraction II, substantially pure allyl 2,2,2-trichloroethylidenecyanoacetate anaylzed as follows:

|  | Found | Calcd. for $C_8H_6O_2NCl_3$ |
| --- | --- | --- |
| Percent C | 37.89 | 37.72 |
| Percent H | 2.45 | 2.36 |
| Percent Cl | 40.95 | 41.80 |

The quantity of Fraction I was substantially twice the amount of Fraction II which was obtained.

Example 2

The herbicidal activity of Fractions I and II of Example 1 as well as of some of the crude products obtained in Example 1 after removal of the ether and comprising a mixture of diallyl 1,3-dicyano-2-(trichloromethyl) glutarate and allyl 2,2,2-trichloroethylidenecyanoacetate was tested. Cucumber seeds and wheat seeds were germinated in separate tests for 4 days each at a temperature of 76° F. in the presence of aqueous suspensions of each of the chemicals shown below at a concentration of 100 p. p. m. Fifty seeds were used for each test. The results are expressed as per cent length of the primary roots in the presence of the chemical compared with the length of the primary roots of controls which had been germinated in water. For comparative purposes, results of tests made in the same manner with two standard herbicides are included.

| Compound Tested | Cucumber | Wheat |
| --- | --- | --- |
| Fraction I | 3 | 65 |
| Fraction II | 3 | 67 |
| Crude Mixture | 3 | 67 |
| Isopropyl Carbanilate | 8 | 2 |
| 2,4-Dichlorophenoxyacetic acid | 6 | 4 |

The very good results obtained by using the crude mixture, i. e., the reaction product obtained before fractionation, is of economic advantage in that the isolating steps are thereby dispensed with. Also, instead of using this crude mixture, there may be employed directly the product obtained before removing the benzene. At that stage the product is a solution of the mixture of diallyl 1,3-dicyano-2-(trichloromethyl) glutarate and allyl 2,2,2-trichloroethylidenecyanoacetate in benzene, together with very small amounts of unreacted material and catalyst. This benzene solution may be used as a concentrate for addition to water or other carriers, either liquid or solid, in the formulation of herbicidal compositions.

The herbicidal efficiency of the present products is remarkable, because as shown in the table given below, related compounds do not possess great herbicidal efficiency. When tested against cucumber seedlings as described above, aqueous suspensions of a random group of such compounds were found to have the following effects:

| Compound Tested | Percent Growth at 100 Parts Per Million |
|---|---|
| Ethyl 2,2,2-trichloroethylidenecyanoacetate | 74 |
| Chloral cyanohydrin acetate | 85 |
| Allyl cyanide | 95 |
| Methallyl trichloroacetate | 99 |

Herbicidal compositions containing the present allyl esters may be oil solutions or oil emulsions of the ester compound. The oil solutions may be obtained simply by dissolving the esters in oil in effective proportions. In most instances, however, it is more expedient to prepare oil concentrates of one of the present compounds or mixtures of the same, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

Instead of dissolving the ester or mixture in oil it may be dissolved in other solvents, and the resulting solutions employed directly as herbicides or employed as concentrates for the preparation of herbicidal aqueous suspensions or dispersions. Solvents which may be used are, e. g., kerosene, hexane, benzene, etc.

Dispersing or emulsifying agents are advantageously employed in the preparation of the present herbicidal suspensions or emulsions.

The present esters are preferably applied by spraying an aqueous suspension or oil emulsion of the same, this method affording an easy and inexpensive way of destroying plant growth. However, they are likewise effective when applied in agricultural dusts; or they may be used with water-insoluble insecticides, fungicides, etc. in customarily employed organic solutions.

While diallyl 1,3-dicyano-2-(trichloromethyl)-glutarate and allyl 2,2,2-trichloroethylidenecyanoacetate are of great interest as herbicides, they may also be used for a wide variety of industrial purposes, e. g., as cross-linking vulcanizers for natural or synthetic rubbers, in the preparation of polycarboxylate synthetic resins and plastics, and as intermediates for the production of chemical derivatives.

What we claim is:

1. The method which comprises contacting chloral with allyl cyanoacetate in the presence of a basic catalyst and recovering allyl 2,2,2-trichloroethylidenecyanoacetate from the resulting reaction product.

2. The method which comprises refluxing chloral with allyl cyanoacetate in the presence of a basic catalyst and recovering allyl 2,2,2-trichloroethylidenecyanoacetate from the resulting reaction product.

3. Allyl 2,2,2-trichloroethylidenecyanoacetate.

DAVID T. MOWRY.
ARTHUR H. SCHLESINGER.

No references cited.